United States Patent [19]

Conrad

[11] Patent Number: 4,722,451
[45] Date of Patent: Feb. 2, 1988

[54] SYNTHETIC POLYMERIC RESIN VACUUM CONTAINER WITH INDICATOR

[75] Inventor: George R. Conrad, Dunwoody, Ga.
[73] Assignee: General Electric Company, Mt. Vernon, Ind.
[21] Appl. No.: 899,158
[22] Filed: Aug. 22, 1986
[51] Int. Cl.⁴ .............................................. B65D 81/20
[52] U.S. Cl. ..................... 215/365; 116/266; 206/524.8; 215/271; 220/DIG. 16
[58] Field of Search ........... 215/365, 366, 1 C, 100 R, 215/230, 271, 316; 220/DIG. 16; 206/524.8, 829, 807; 116/266, 200, DIG. 7

[56] References Cited

U.S. PATENT DOCUMENTS

| | | | |
|---|---|---|---|
| 2,077,985 | 4/1937 | Bukolt | 215/316 X |
| 2,458,360 | 1/1949 | Fay et al. | 215/316 X |
| 3,160,302 | 12/1964 | Chaplin | 215/271 |
| 3,736,899 | 6/1973 | Manske | 220/DIG. 16 |
| 3,930,592 | 1/1976 | Dilanni | 220/DIG. 16 X |
| 3,960,002 | 6/1976 | Choksi et al. | 73/52 |
| 4,295,566 | 10/1981 | Vincek | 116/266 X |
| 4,591,062 | 5/1986 | Sandhaus | 206/807 X |
| 4,616,761 | 10/1986 | Nolan | 215/271 |
| 4,653,643 | 3/1987 | Black | 206/807 X |

FOREIGN PATENT DOCUMENTS

| | | | |
|---|---|---|---|
| 6602639 | 11/1966 | Netherlands | 220/DIG. 16 |
| 216798 | 11/1967 | Sweden | 220/DIG. 16 |

Primary Examiner—William Price
Attorney, Agent, or Firm—Joseph T. Eisele; Martin B. Barancik

[57] ABSTRACT

Vacuum containers of synthetic polymeric resins include a wall portion deformable under vacuum containing conditions, to give a visual indication of the vacuum integrity. The containers by virtue of the deformable portion resist paneling.

2 Claims, 10 Drawing Figures

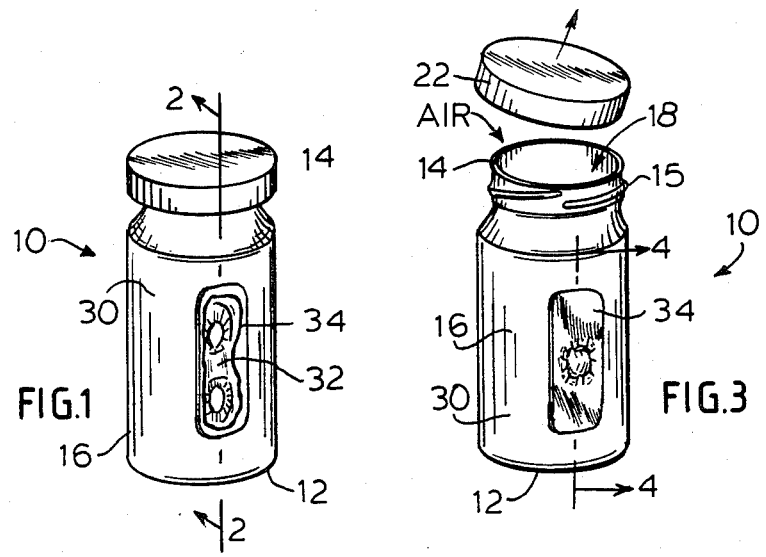
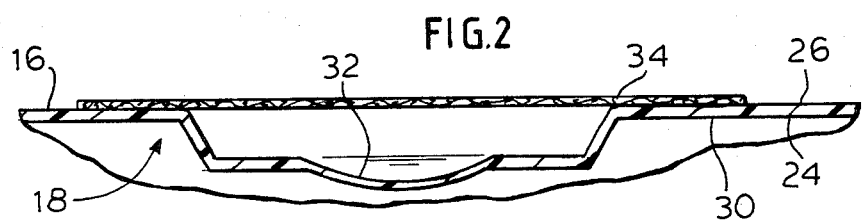
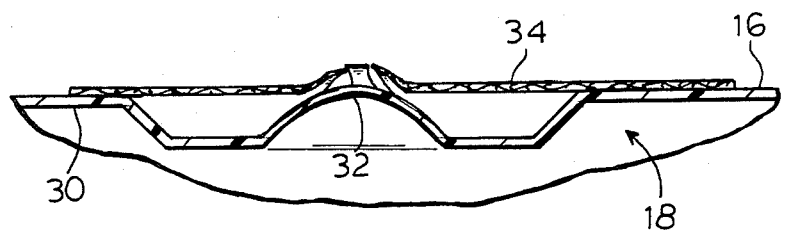

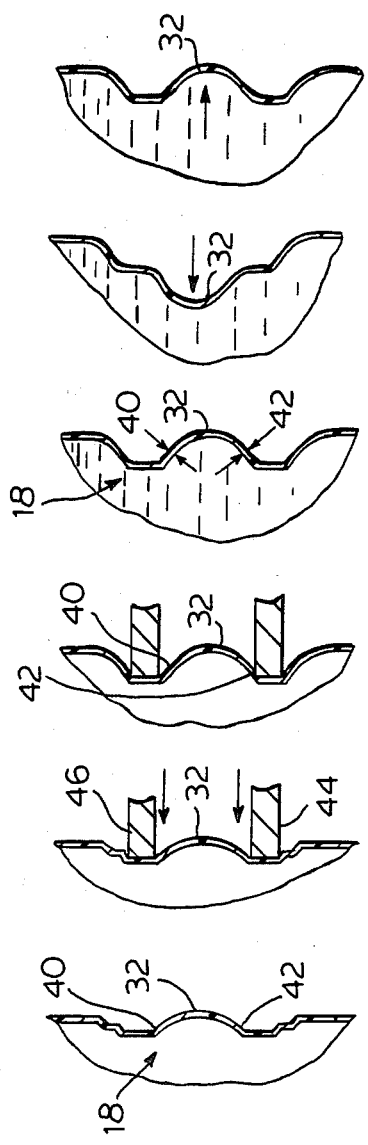

SYNTHETIC POLYMERIC RESIN VACUUM CONTAINER WITH INDICATOR

BACKGROUND OF THE INVENTION

1. Field of the Invention

The invention relates to vacuum containers fabricated from synthetic polymeric resins.

2. BRIEF DESCRIPTION OF THE PRIOR ART

A wide variety of vacuum containers fabricated from synthetic polymeric resins are used to contain an equally wide variety of materials. The advantages of such containers over earlier fabrications from glass, metal and like substances are well recognized and include a reduction in weight.

An example of a material advantageously contained under a vacuum is a foodstuff. In this case, the vacuum in the container may be established in a hot-fill application, i.e., when the food material for containment is placed in the container while it is at a high temperature, in comparison to the storage temperature of the container. Examples of such hot-fill applications include the packaging of foods, such as jams, baby juice and the like. As the container contents cool, the content volume decreases at a greater rate than the resin container, thereby creating a vacuum within the sealed container.

The container of the present invention is an improvement in the art, providing visible (and at times audible) means of ascertaining its vacuum integrity. In addition, the containers of the invention may be fabricated from thinner, lighter films of synthetic polymeric resins without encouraging "paneling" when the vacuum is established. Paneling is the total or partial collapse of a container structure which may occur when the container walls are not sufficiently strong to resist deformation if there is a pressure differential between the container internally and externally. The deformation or collapse may even be severe enough to cause a rupture of the total container. More frequently however there is a partial collapse, including in a multi-layer container, the rupturing of any of the layers or the loss of adhesion between layers. Such failure renders the container useless for many purposes.

In blown film containers of the invention, critical sealing areas such as the bottom pinch-off and the parting line are relieved of added stress from the delta pressure.

All of the above advantages associated with the containers of the invention are economic in nature and additionally provide added safety to the consumer who purchases materials packaged in the containers of the invention. Safety is found in the tamper-proof, vacuum indicators provided in the containers of the invention.

SUMMARY OF THE INVENTION

The invention comprises a container assembly for the containment of a material under vacuum, said container having vacuum indicating means, which comprises;
(A) an air-pressure deformable, hollow tube of synthetic polymeric resin, said tube having
  (i) a closed, first end;
  (ii) an open, second end; and
  (iii) a tube body joining together and positioned between the first and the second end; and
(B) removable closure means for hermetically closing the second end;
  said hollow tube and said closure means when closing the second end, together forming a container interior wall and a container exterior wall, said interior wall defining an interior closed chamber for the containment of the material under vacuum, said exterior wall being exposed to the atmosphere;
  said assembly further including between the interior and the exterior walls
(C) a body integral, first zone; and
(D) a body integral, second zone;
  said first zone being deformable when a first pressure differential exists between the interior and the exterior walls;
  said second zone being deformable when a second pressure differential exists between the interior and the exterior walls;
  said first pressure differential being less than said second pressure differential and said second pressure differential being higher than the differential expected when the container is employed to contain a given vacuum condition;
  whereby, said first zone is deformed when the vacuum condition is present, while the second zone is not deformed.

The containers of the invention are useful to package materials under vacuum conditions.

The term "vacuum" as used herein means a partial diminution of normal atmospheric pressure.

BRIEF DESCRIPTION OF THE DRAWINGS

FIG. 1 is a view-in-perspective of an embodiment container of the invention, containing a material under vacuum conditions and showing the label partially cut away.

FIG. 2 is a view along lines 2—2 of FIG. 1.

FIG. 3 is an enlarged view of the container shown in FIG. 1, but after opening of the container and loss of vacuum.

FIG. 4 is an enlarged view along lines 4—4 of FIG. 3.

FIG. 5 is a view as in FIG. 4, but without the label component.

FIGS. 6–8 are views as in FIG. 5, showing a method of fabrication.

FIGS. 9–10 are views as in FIG. 5, showing operation and function of the vacuum indicating means associated with the embodiment container of the invention.

DETAILED DESCRIPTION OF THE PREFERRED EMBODIMENTS OF THE INVENTION

A complete understanding of the invention may be readily obtained from the following description of the preferred embodiments when read in conjunction with the accompanying drawings on FIGS. 1–10, inclusive.

Referring first to FIG. 1, there is seen a view-in-perspective of an embodiment container 10 of the invention. The container 10 may be a relatively thin-walled (pressure deformable) mono or multi-layered container fabricated from synthetic, polymeric resins such as polycarbonate, polypropylene, ethylene vinyl alcohol, polyethylene terephthalate, polyvinyl chloride, commercial tie layers such as CXA (available from E.I. DuPont) and the like. The techniques for fabricating containers 10 are well known to those skilled in the art and details need not be recited herein. The container 10, which may be fabricated in any desired size may have a tubular shape with a closed end 12 and an open end 14. The ends 12,14 are joined together by a tubular body 16. The ends 12,14 together with body 16 define and enclose an interior chamber 18 for the containment of a material to be packaged therein, under vacuum conditions.

The open end 14 of container 10 is hermetically closed with a gas-proof closure in the form of a cap 22. The cap 22 is removably mounted on the end 14 of container 10 through the agency of threads 15 on the outer surface of the end 14, which threads 15 matingly engage with corresponding threads 44 on the inner surface of the cap 22. The cap 22, which may be fabricated from metal or a synthetic polymeric resin such as a polycarbonate, screws downward on the threads 15 to hermetically seal chamber 18. To gain access to the chamber 18 of the container 10, the cap 22 may be unthreaded from its engagement with the threads 15. Sealant compositions may be used in association with cap 22 to obtain a hermetic seal. Any other conventional means may be used to obtain a hermetic closure of the open end 14.

The tubular body 16 comprises an interior wall 24 and an exterior wall 26 (see FIG. 2), the walls 24,26 together sandwiching the body 16, wall 24 defining the interior chamber 18 and wall 26 being exposed to the open atmosphere. The tubular body 16 together with walls 24,26 further comprises air-pressure deformable walls.

The term "deformable walls" as used herein means that the container 10 walls with body 16 are subject to paneling or other air pressure induced changes when there is a differential between the container 16 internal and external atmospheric pressure.

Although the body 16 of container 10 is generally substantially homogeneous and uniform in its make-up, there are two structurally distinct zones, each integral and continuous with the other. The major portion of the body 16 comprises zone 30, while a minor portion comprises zone 32, underlying a paper label 34 (see FIG. 2 and the partially cutaway label 34 in FIG. 1). The zones 30,32 differ from each other in that the zone 32 will deform under less of a pressure differential between the interior and the exterior of container 10 than will the zone 30. The zone 32 may therefore function as a visually observable indicator means of certain pressure differentials within and without the container 10, i.e.; a container vacuum indicating means. Under normal operating conditions, the container 10 will maintain its structural integrity, i.e., will resist paneling while the zone 32 responds to pressure differentials between the container internally and externally, by deforming.

After filling and hermetically sealing the container 10, a pressure differential, vacuum will develop in the chamber 18 of container 10. FIG. 3 is a view of the embodiment closure of the invention as shown in FIG. 1, but after removal of the closure 22 to remove vacuum pressure within the container 10. As shown in FIG. 1 and FIG. 3, development of the vacuum pressure within the container 10 does not result in a deformation of the zone 30, i.e., paneling or any other damage to the structure of the container 10. The vacuum pressure within the container 10 is modulated by an inward expansion of the deformable zone 32 as a compensating action, thereby preserving the integrity of the container 10.

FIG. 2 is a view along lines 2—2 of FIG. 1, i.e.; after the development of a vacuum within the container 10. The deformable zone 32 expands inwardly of chamber 18 to reduce its volume, thereby preserving the overall integrity of the body 16. As shown in FIG. 2, the zone 32 may be covered with a frangible label 34, adhered with an adhesive; preferably a paper label. This is optional, and it may be preferred in some circumstances to have the zone 32 accessible for visual observation.

FIG. 4 is a cross-sectional view along lines 4—4 of FIG. 3 and shows the zone 32 after release of the vacuum from chamber 18. The zone 32 has moved outwardly of the chamber 18 to its normal position when there is no pressure differential between the inside and the outside of the container 10. In the force of its outward movement following the release of vacuum, the zone 32 may force a tear in the frangible label 34, providing a visual indication of vacuum loss. This is a safety indicator which may serve to alert an individual that the container contents are no longer protected by vacuum conditions. As described in relation to FIG. 2, the presence of the label 34 is optional and without it, direct observation of zone 32 is possible.

In addition to the visual indication of presence or loss of vacuum provided by the containers of the invention, an audible indication is given when the vacuum is lost. Upon opening of the container 10, sudden loss of vacuum causes the zone 32 to respond as described above, usually with an associated "pop" sound which is an auditory indicator of the vacuum loss. If the audible sound is not heard upon opening of the container, the operating individual is alerted to the possibility that the contained material was not stored under vacuum conditions.

The container 10 of the invention may be prepared employing conventional apparatus and techniques. Referring first to FIG. 5, a cross-sectional side view as in FIG. 4 is seen, wherein the vacuum deformable zone 32 is in a relaxed condition, i.e., the chamber 18 does not contain vacuum. This configuration of the deformable zone 32 may be incorporated into the container during fabrication of the container 10 by conventional means such as blow molding. The key to its functional design is relatively thinner body 16 area at the location 40 and the location 42; in comparison to the remainder of the body 16. This thinness in the areas 40,42 may be obtained by a reduction in the parison thickness at the critical points, during the parison extrusion and subsequent blow molding of the body 16. Techniques for achieving this objective are well-known to those skilled in the art. The relatively thinner areas 40,42 at the terminal periphery of zone 32 permits flexible movement of the zone 32 inwardly and outwardly of chamber 18, as described above. The structure shown in FIG. 5 has memory so that when the zone 32 does flex inwardly under vacuum conditions in chamber 18, it will subsequently return to the position shown in FIG. 5 upon release of the vacuum from chamber 18.

In a preferred method of fabricating the container 10, the deformable zone 32 is obtained by post-forming technique. Referring now to FIGS. 6 and 7, there is illustrated the formation of the relatively thin areas 40,42 with zone 32 between, by pressure of thermal forming posts 44 and 46 against a preformed container 10 body 16. The thermal posts 44,46 are pressed against the body 16 of container 10 under sufficient heat and pressure to deform the affected areas, thinning areas 40,42 and establishing the deformable zone 32. FIG. 8 shows in greater detail the areas 40, 42 and their establishment as pivot points for flexure of the deformable zone 32 in or out of the chamber 18. The movement of the deformable zone 32 in and out of the chamber 18 under appropriate vacuum or non-vacuum conditions, as described above, is shown in the FIGS. 9 and 10.

From the above description it will be appreciated that the container of the invention provides a means of controlling changes in the internal pressure which develops in synthetic, polymeric resin containers during the after packaging and post treatment, especially of food items. Vacuum developed may be severe enough to distort, rupture or in other ways make unsealable plastic containers. The invention is particularly advantageous when the pressure differential which occurs is severe enough to cause overall container paneling as described above. The invention is particularly advantageous for use in multi-layered polymeric resin containers. The multi-layer containers are subject to more pressure induced complications than a single layer wall design, as previously mentioned.

Those skilled in the art will appreciate that many modifications to the above-described preferred embodiments of the invention may be made without departing from the spirit and scope of the invention. For example, the preferred embodiment container of the invention is described as being a substantially round "bottle" or jar. However, the container may be of any shape of configuration, including but not limited to oval, rectangular, square-shaped, pyrimidol, or tray types of containers.

What is claimed is:

1. A container assembly for the containment of a material under vacuum, said container having vacuum indicating means, which comprises;
(A) an air-pressure deformable, hollow tube of synthetic polymeric resin, said tube having
    (i) a closed, first end;
    (ii) an open, second end; and
    (iii) a tube body joining together and positioned between the first and the second end; and
(B) removable closure means for hermetically closing the second end;
    said hollow tube and said closure means when closing the second end, together forming a container interior wall and a container exterior wall, said interior wall defining and interior closed chamber for the containment of the material under vacuum, said exterior wall being exposed to the atmosphere;
    said assembly further including between the interior and the exterior walls
(c) a body integral, first zone;
(d) a body integral, second zone;
    said first zone being deformable when a first pressure differential exists between the interior and the exterior walls;
    said second zone being deformable when a second pressure differential exists between the interior and the exterior walls;
    said first pressure differential being less than said second pressure differential and said second pressure differential being higher than the differential expected when the container is employed to contain a given vacuum condition;
    whereby, said first zone is deformed when the vacuum condition is present, while the second zone is not defored; and
(e) a frangible label adhesively adhered to and covering the first zone, after the first zone is deformed and when the vacuum condition is present so that when the vacuum condition is subsequently removed, the first zone will revert to the non-deformed condition and cause the adhered frangible label to tear.

2. The container of claim 1 wherein the tubular body is fabricated from multi-layers of synthetic, polymeric resins.

* * * * *